US012000468B2

(12) United States Patent
Lee (10) Patent No.: US 12,000,468 B2
(45) Date of Patent: Jun. 4, 2024

(54) LIMITED SLIP DIFFERENTIAL AND CONTROLLING METHOD THEREFOR

(71) Applicant: Hyundai WIA Corporation, Changwon-si (KR)

(72) Inventor: Hyung Il Lee, Seongnam-si (KR)

(73) Assignee: Hyundai Wia Corporation, Changwon-si (KR)

( * ) Notice: Subject to any disclaimer, the term of this patent is extended or adjusted under 35 U.S.C. 154(b) by 0 days.

(21) Appl. No.: 17/760,069

(22) PCT Filed: Feb. 5, 2021

(86) PCT No.: PCT/KR2021/001567
§ 371 (c)(1),
(2) Date: Aug. 3, 2022

(87) PCT Pub. No.: WO2021/162360
PCT Pub. Date: Aug. 19, 2021

(65) Prior Publication Data
US 2023/0068948 A1  Mar. 2, 2023

(30) Foreign Application Priority Data

Feb. 12, 2020 (KR) .......... 10-2020-0016927

(51) Int. Cl.
*F16H 48/22* (2006.01)
*B60K 17/348* (2006.01)
(Continued)

(52) U.S. Cl.
CPC .......... *F16H 48/32* (2013.01); *B60K 17/35* (2013.01); *F16H 48/22* (2013.01); *F16H 48/24* (2013.01);
(Continued)

(58) Field of Classification Search
CPC .......... F16H 48/32; F16H 48/22; F16H 48/24; F16H 2048/204; B60K 17/35; B60K 17/351; B60K 17/348; B60K 6/08–547
See application file for complete search history.

(56) References Cited

U.S. PATENT DOCUMENTS 4,790,211 A  *  12/1988  Iwatsuki  ............ B60K 17/3462
                                                  475/221
2004/0129475 A1 *  7/2004  Forsyth  ................... F16H 48/08
                                                  180/233
(Continued)

FOREIGN PATENT DOCUMENTS

CN    108474462 A  *  8/2018  ............. B60B 35/18
CN    109114191 A  *  1/2019  ............. B60K 17/02
(Continued)

OTHER PUBLICATIONS

International Search Report of PCT/KR2021/001567 in 4 pages (dated Jun. 2, 2021).

*Primary Examiner* — Tinh Dang
(74) *Attorney, Agent, or Firm* — Knobbe, Martens, Olson & Bear, LLP (57) ABSTRACT

The present invention relates to a technology in which a transition between a medium-torque transmission state and a high-torque transmission state by a limited slip differential is continuously performed during a driving process of a vehicle. The present invention introduces a limited slip differential configured to comprise: an input shaft constantly connected to a differential case of a slip differential; an output shaft selectively connected to the input shaft via a clutch pack and constantly connected to a wheel; a medium-torque transmission means for pressing a clutch plate coupled to the input shaft to press-fit the clutch pack; and a high-torque transmission means selectively engaged with the clutch plate by moving a hub coupled to the output shaft in a state where the input shaft and the output shaft are synchronized as the clutch pack is fastened, and a controlling method therefor.

4 Claims, 8 Drawing Sheets (51) Int. Cl.
    *B60K 17/35*         (2006.01)
    *F16D 25/0638*     (2006.01)
    *F16H 48/20*         (2012.01)
    *F16H 48/24*         (2006.01)
    *F16H 48/26*         (2006.01)
    *F16H 48/32*         (2012.01)

(52) U.S. Cl.
    CPC ............ *F16H 48/26* (2013.01); *B60K 17/348* (2013.01); *B60K 17/351* (2013.01); *F16H 2048/204* (2013.01)

(56) References Cited

U.S. PATENT DOCUMENTS

| | | | |
|---|---|---|---|
| 2011/0127135 A1* | 6/2011 | Grogg | B60K 17/35 |
| | | | 192/85.01 |
| 2015/0045171 A1* | 2/2015 | Schimpf | F16H 48/295 |
| | | | 475/249 |
| 2022/0274478 A1* | 9/2022 | Tabata | B60K 6/365 |

FOREIGN PATENT DOCUMENTS

| | | |
|---|---|---|
| JP | H06-063556 B2 | 8/1994 |
| JP | 2011-247326 A | 12/2011 |
| KR | 10-0415337 B1 | 4/1999 |
| KR | 10-2012-0112061 A | 10/2012 |
| KR | 10-2014-0080092 A | 6/2014 |

* cited by examiner

LIMITED SLIP DIFFERENTIAL AND CONTROLLING METHOD THEREFOR

TECHNICAL FIELD

The present disclosure relates to a limited slip differential and a method for controlling the same, wherein switching between a medium-torque transmission state and a high-torque transmission state by the limited slip differential is implemented continuously during a vehicle driving process.

BACKGROUND ART

A differential refers to a device for generating a speed difference between inside and outside wheels when a vehicle swivels.

When a wheel of the vehicle enters a low-friction road surface (for example, sand or frozen road), the wheel that has entered the low-friction road surface spins with no traction at a high rate, while almost no power is transmitted to a wheel positioned on a high-friction road surface, making it difficult for the vehicle to escape from the low-friction road surface.

Meanwhile, a limited slip differential refers to a device for solving drawbacks of such a differential, and plays the role of limiting the differential action.

For example, the limited slip differential may be provided between a differential and a wheel, and a multi-plate clutch may be provided between an input shaft connected to a case of the differential and an output shaft connected to the wheel.

If the multi-plate clutch engages, the torque applied from the input shaft is transmitted to the output shaft through the multi-plate clutch, thereby limiting the differential action by the differential.

The torque transmission force transmitted through the multi-plate clutch is determined by the disk size of the multi-plate clutch, the piston pressurizing force, and the like, and in order to transmit a high torque of 5000 Nm or more, the size of the multi-plate clutch and the pressurizing force of the piston need to increase.

In addition, n order to increase the pressurizing force, the piston size needs to be increased, and the power source of pressurization (for example, motor or pump) needs to have an increased size.

However, if the size of components constituting the limited slip differential is increased, the vehicle mountability is degraded, the vehicle weight increases, costs rise, and other problems make it difficult to apply the same to a vehicle.

Meanwhile, Korean Laid-open Patent Publication No. 10-2018-0038372 has been proposed as a prior art for solving such problems.

A limited slip differential for a vehicle according to the prior art has a screw mechanism configured to convert rotations of an electric motor to linear movements of a side gear shaft of a nut member in a first axis direction.

If a piston installed on the nut member moves opposite to the direction in which a friction engagement element is pressurized, the piston and the clutch drum engage and become unable to rotate relative to each other, thereby mechanically limiting the differential rotation of the pair of side gears.

Accordingly, by rotating a single electric motor, the rear-wheel differential generates a differential limiting torque for limiting the differential rotation of the pair of side gears, or the differential rotation of the pair of side gears is limited mechanically.

However, the prior art has a problem in that, if switching is to be made from a state in which the differential limiting torque is generated to a state in which the differential rotation is limited mechanically, generation of the differential limiting torque needs to be released, and the differential rotation needs to be limited after stopping the vehicle. In other words, it is very inconvenient to mechanically limit the differential rotation.

The above descriptions regarding background technologies have been made only to help understanding of the background of the present disclosure, and are not to be deemed by those skilled in the art to correspond to already-known prior arts.

Relevant prior arts include KR 10-2018-0038372 A.

DISCLOSURE

Technical Tasks

The present disclosure has been made to solve the above-mentioned problems, and it is an aspect of the present disclosure to provide a limited slip differential and a method for controlling the same, wherein switching between a medium-torque transmission state and a high-torque transmission state by the limited slip differential is implemented continuously during a vehicle driving process.

Solution

In accordance with an aspect, the present disclosure may include: an input shaft constantly connected to a differential case of a differential; an output shaft selectively connected to the input shaft via a clutch pack and constantly connected to a wheel; a medium-torque transmission means configured to press a clutch plate coupled to the input shaft such that the clutch pack is compressed and engaged; and a high-torque transmission means by which a hub coupled to the output shaft is moved in a state in which the input shaft and the output shaft are synchronized according to the engagement of the clutch pack and thus is selectively meshed with the clutch plate.

The medium-torque transmission means may include: a clutch plate provided at an end portion of the clutch pack and spline-coupled to the inner peripheral surface of the input shaft to be moved in the axial direction; and a first piston configured to press the clutch plate in a direction in which the clutch pack is engaged.

The high-torque transmission means may include: a plate inner tooth formed on the clutch plate; the hub spline-coupled to the outer peripheral surface of the output shaft to be moved in the axial direction; a hub outer tooth formed on the hub in a shape corresponding to the plate inner tooth so as to be meshed with the plate inner tooth; and a second piston configured to press the hub such that the hub outer tooth is moved to a location at which the hub outer tooth is meshed with the plate inner tooth.

The plate inner tooth may be formed on the inner peripheral surface of the clutch plate; and the hub outer tooth may be formed on the outer peripheral surface of the hub to be spline-coupled to the plate inner tooth.

An output retainer may be integrally formed in a cylindrical shape extending in the outer radial direction from a shaft portion of the output shaft; one end of the hub may be spline-coupled to the outer peripheral surface of an end portion of the output retainer; and the other end of the hub may be inwardly bent to be pressed by the second piston.

A method for controlling an operation of a limited slip differential according to the present disclosure may include: a medium-torque transmission step in which when a medium-torque transmission condition required by the limited slip differential according to a driving state of a vehicle is satisfied, a controller performs control such that the clutch plate is pressed to enable the clutch pack to be compressed and engaged; and a high-torque transmission step in which when a high-torque transmission condition required by the limited slip differential according to a driving state of the vehicle is satisfied, the controller performs control such that the hub coupled to the output shaft in a state in which the input shaft and the output shaft are synchronized by the medium-torque transmission is meshed with the clutch plate.

Advantageous Effects

The present disclosure is advantageous, through the above-mentioned solutions to problems, in that a differential limiting action at a medium-torque level and a differential limiting action at a high-torque level can be continuously switched such that differential limiting transmission torque can be seamlessly connected up to the target transmission torque. Accordingly, the escape performance of the vehicle can be improved under road surface conditions such as rough roads and low-friction roads, and the differential limiting action can be switched by increasing/decreasing the transmission torque without a separate driver manipulation, thereby improving driving convenience.

EMBODIMENTS

An embodiment of the present disclosure will be described in detail with reference to the accompanying drawings.

Figure 1:
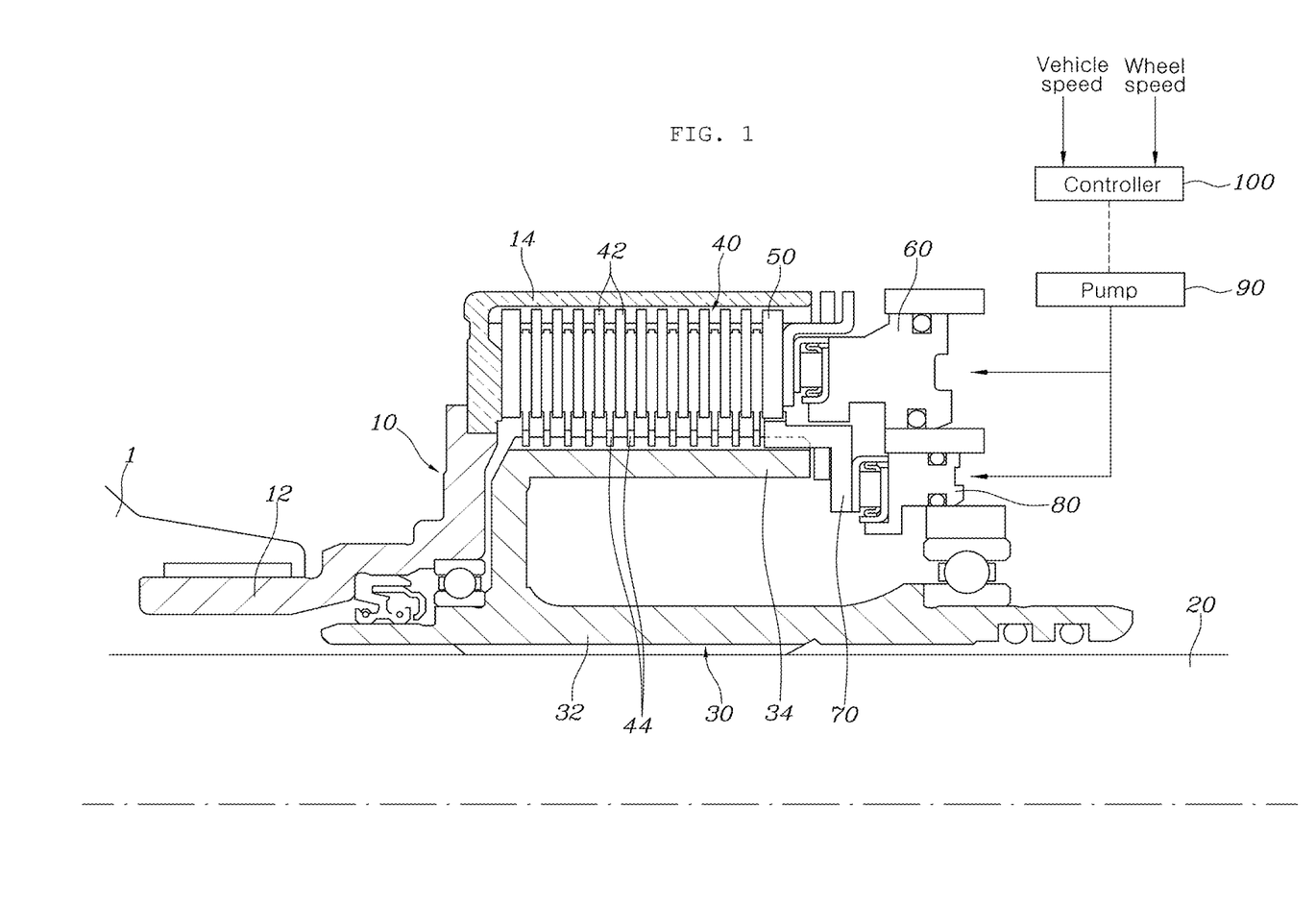
FIG. 1 is a cross-sectional view illustrating a structure of a limited slip differential according to the present disclosure.

FIG. 1 illustrates a limited slip differential applicable to the present disclosure, and the limited slip differential is installed on a side of a differential by using an inner shaft 20 as an axis.

In view of the configuration of the limited slip differential with reference to the drawings, one end of an inner shaft 20 formed as a solid shaft is connected to one side gear (not shown) inside a differential (not shown), and the other end of the inner shaft 20 is connected to a wheel (not shown) of a vehicle through a constant velocity joint.

In addition, an input shaft 10 is formed as a hollow shaft to be inserted to be relatively rotatable with respect to the inner shaft 20, thereby forming a structure which is constantly connected to a differential case 1 of the differential and rotates together therewith.

Furthermore, an output shaft 30 is formed as a hollow shaft to be inserted to be rotatably constrained to the inner shaft 20, and the output shaft 30 and the input shaft 10 are connected via a clutch pack 40 to be configured to selectively transmit the torque transmitted from the input shaft 10 to a wheel through the output shaft 30.

That is, the output shaft 30 is selectively connected to the input shaft 10 via the clutch pack 40 to form a structure constantly connected to a wheel through the inner shaft 20, thereby selectively transmitting the torque transmitted from the input shaft 10 to the wheel.

According to the structure described above, since the clutch pack 40 is released in a normal driving situation, the power input to the differential is transmitted to the inner shaft 20 through the side gear of the differential, and accordingly, the power is transmitted to the wheel of the vehicle through the inner shaft 20.

On the other hand, since the clutch pack 40 is engaged in a driving situation requiring a differential limiting action, the power input to the differential is transmitted to the input shaft 10 through the differential case 1 of the differential, the power transmitted to the input shaft 10 is transmitted to the output shaft 30 through the clutch pack 40 and then the power is transmitted to the inner shaft 20 from the output shaft 30 so as to be transmitted to the wheel of the vehicle.

Particularly, the present disclosure includes a medium-torque transmission means configured to press a clutch plate 50 coupled to the input shaft 10 such that the clutch pack 40 is compressed and engaged, and a high-torque transmission means by which a hub 70 coupled to the output shaft 30 is moved in a state where the input shaft 10 and the output shaft 30 are synchronized according to the engagement of the clutch pack 40 and thus is selectively meshed with the clutch plate 50.

For example, the medium-torque is a torque transmittable in a general limited slip differential, and may be the maximum torque that can be realized in a state in which disks of the clutch pack 40 provided in the limited slip differential are face-pressed and engaged, which may vary depending on the specifications of the clutch pack 40.

The high-torque is a torque higher than the medium-torque by a certain amount or more, and may be a torque that can be realized in a state in which the disks of the clutch pack 40 are mechanically engaged.

For reference, a multi-plate clutch is preferably applied to the clutch pack 40, but other types of clutch mechanisms having identical or similar torque transmission capacity to the multi-plate clutch may also be applicable.

Figure 3:
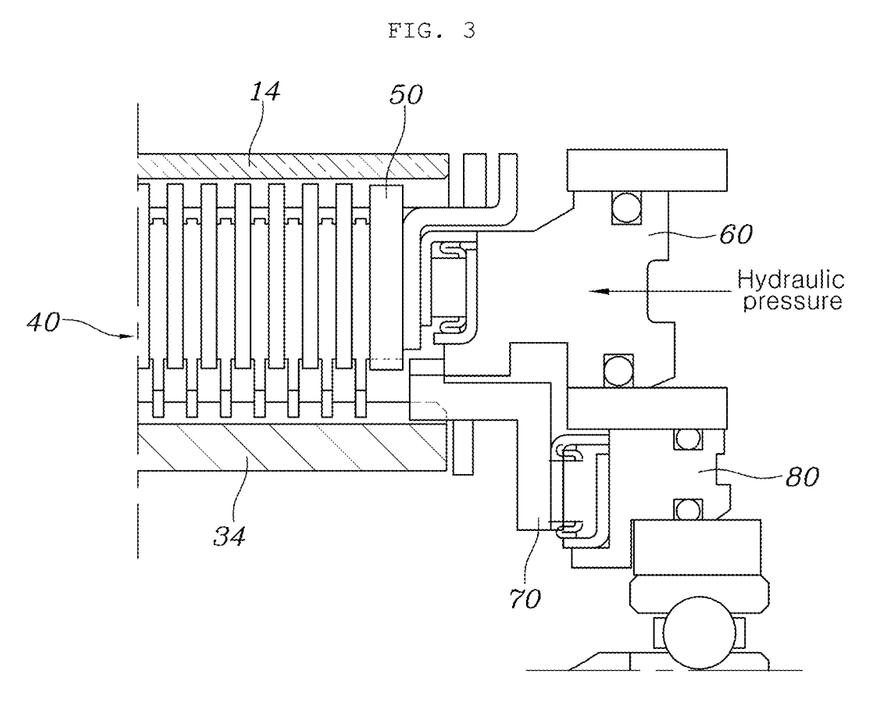
FIG. 3 illustrates a differential operation state at a medium-torque level by the limited slip differential of the present disclosure.

That is, when torque transmission at a medium-torque level is required by the limited slip differential, the multi-plate clutch 40 is engaged using the clutch plate 50 coupled to the input shaft 10 as shown in FIG. 3 so that the differential action is limited by the compression engaging force.

Figure 4:
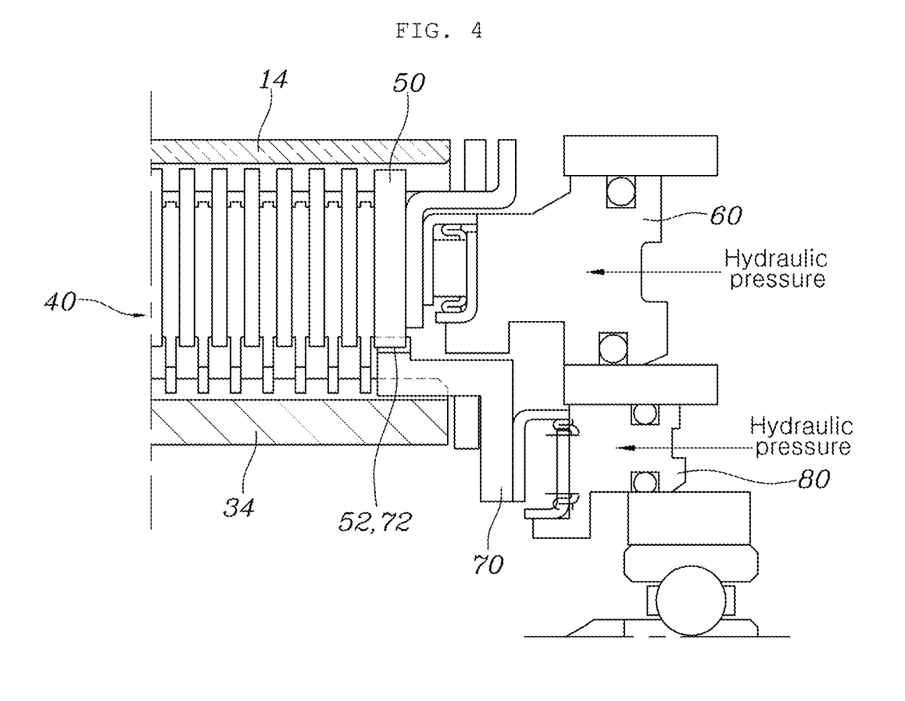
FIG. 4 illustrates a differential operation state at a high-torque level by the limited slip differential of the present disclosure.

When torque transmission at a high-torque level is required by the limited slip differential, the hub 70 coupled to the output shaft 30 is pushed to be mechanically meshed with the clutch plate 50 since rotations of the input shaft 10 and the output shaft 30 are synchronized by the compression engaging force of the multi-plate clutch 40 as shown in FIG.

4, and accordingly a differential action is limited by the mechanical coupling force between the hub 70 and the clutch plate 50.

As described above, the present disclosure enables a transition between a medium-torque transmission state and a high-torque transmission state by a limited slip differential to be continuously performed during a driving process of a vehicle, thereby improving the rough road-escaping performance of the vehicle as well as improving driving convenience.

In view of the configuration of the medium-torque transmission means in detail with reference to FIGS. 1 and 3, the clutch plate 50 is provided at an end portion of the clutch pack 40, and the clutch plate 50 is spline-coupled to the inner peripheral surface of the input shaft 10 to move in the axial direction.

In addition, a first piston 60 is configured to press the clutch plate 50 in a direction in which the clutch pack 40 is engaged.

For example, an input retainer 14 is integrally formed in a cylindrical shape extending in the outer radial direction from one end of a shaft portion 12 of the input shaft 10, and a plurality of driving disks 42 are spline-coupled to the inner peripheral surface of the input retainer 14.

In addition, the output retainer 34 is integrally formed in a cylindrical shape extending from the middle of a shaft portion 32 of the output shaft 30 to the outer radial direction, a plurality of driven disks 44 are spline-coupled to the outer peripheral surface of the output retainer 34, and the driven disk 44 is positioned between the driving disks 42, thereby constituting the multi-plate clutch 40.

In particular, the clutch plate 50 is spline-coupled to an end portion of the inner peripheral surface of the input retainer 14 which corresponds to an outer side thereof.

Accordingly, the first piston 60 is movably provided in the axial direction facing the clutch plate 50 so that the first piston 60 presses the clutch plate 50 in the axial direction, thereby compressing and engaging the multi-plate clutch 40.

At this time, the first piston 60 is preferably operated using hydraulic pressure, but may also be operated by electric driving force using an actuator. In this case, a mechanical connection structure is provided between the actuator and the first piston 60 to transmit driving force.

In addition, referring to FIGS. 1 and 4, in view of the configuration of the high-torque transmission means in detail, a plate inner tooth 52 is formed on a portion of the clutch plate 50.

Then, the hub 70 is spline-coupled to the outer peripheral surface of the output shaft 30 so that the hub 70 is moved in the axial direction.

In addition, a hub outer tooth 72 is formed on a portion of the hub 70 in a shape corresponding to the plate inner tooth 52, and the hub outer tooth 72 is meshed with the inner plate tooth 52.

The hub 70 is configured to be pressed by a second piston 80 such that the hub outer tooth 72 can be moved to a position where the same is meshed with the plate inner tooth 52.

For example, a gear-shaped plate inner tooth 52 is formed along the inner peripheral surface of the clutch plate 50.

Then, the hub 70 is spline-coupled to an end portion of the outer peripheral surface of the output retainer 34 formed on the output shaft 30, and a gear-shaped hub outer tooth 72 is formed along the outer peripheral surface of the end of the hub 70 which is the closest to the clutch plate 50.

The second piston 80 is movably provided in the axial direction facing the hub 70 so that hub 70 is pushed by the second piston 80 in the axial direction, and accordingly the hub outer tooth 72 is moved to a position corresponding to the plate inner tooth 52 such that the hub outer tooth 72 is meshed with the plate inner tooth 52 to a spline structure.

At this time, the second piston 80 is preferably operated using hydraulic pressure as for the first piston 60, but may also be operated by electric driving force using an actuator. In this case, a mechanical connection structure is provided between the actuator and the second piston 80 to transmit driving force. For reference, although not shown in the drawings, the first piston 60 and the second piston 80 may be moved back by a return spring.

Figure 2:
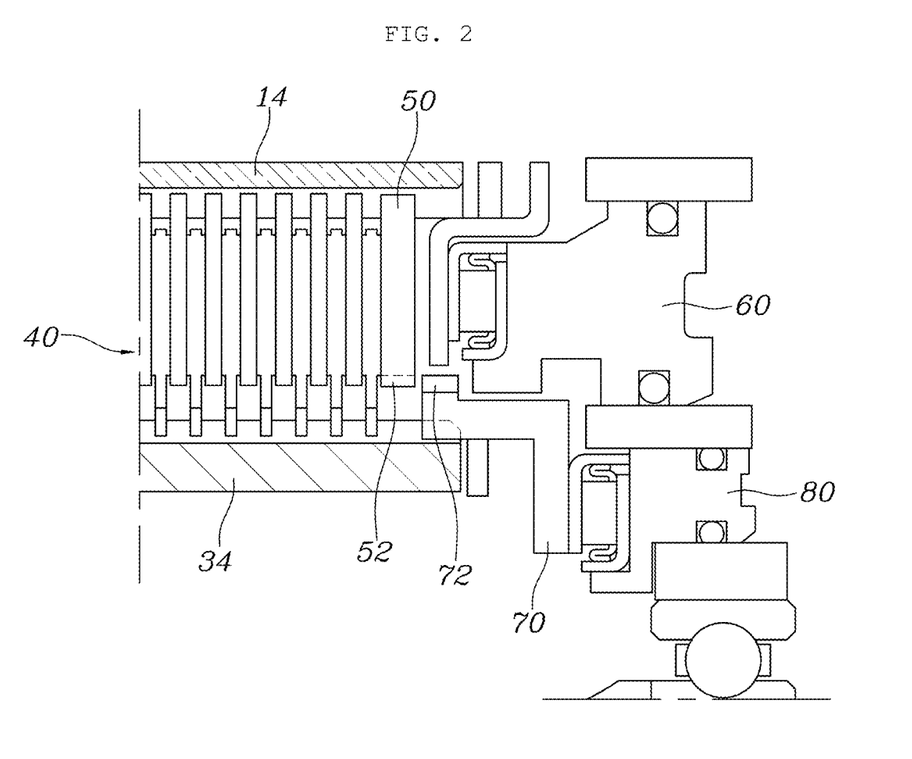
FIG. 2 illustrates a state in which the differential action by the limited slip differential of the present disclosure is released.

Referring to FIG. 2, the outer peripheral surface of one end of the hub 70 is spline-coupled to the outer peripheral surface of the end of the output retainer 34, and the other end of the hub 70 is bent from one end to the inner radial direction, thereby having a structure in which the other of the hub 70 is pressed by the second piston 80.

For example, when the other end of the hub 70 is bent in the inner radial direction, the outer surface of the other end of the hub 70 is pressed by the second piston 80, and the inner surface of the other end of the hub 70 faces the end portion of the output retainer 34.

Accordingly, the inner surface of the other end of the hub 70 is caught on the end portion of the output retainer 34 in a state in which the hub outer tooth 72 is completely spline-coupled to the plate inner tooth 52 by the hub 70 pressed by the second piston 80, thereby restraining the hub 70 from excessively moving to the inside of the multi-plate clutch 40 and preventing the multi-plate clutch 40 from being damaged.

A method for controlling the operation of the limited slip differential according to the above configuration includes a medium-torque transmission step, and a high-torque transmission step.

Referring to FIG. 1, first, in the medium-torque transmission step, when a medium-torque transmission condition required by the limited slip differential according to a driving state of the vehicle is satisfied, a controller 100 performs control such that the clutch plate 50 is pressed to enable the clutch pack 40 to be compressed and engaged.

For example, when factors, such as vehicle speed and wheel speed, reflecting the driving state of the vehicle are detected by respective sensors to be input to the controller 100, the controller 100 analyzes the input values to determine whether the medium-torque transmission condition is satisfied, and as a result of the determination, the controller 100 performs, when determines that the medium-torque transmission condition is satisfied, a differential limiting action by causing the first piston 60 to operate through the operation of the pressure driving source (pump) 90 such that the multi-plate clutch 40 is compressed and engaged.

In the high-torque transmission step, when a high-torque transmission condition required by the limited slip differential according to the driving state of the vehicle is satisfied, the controller 100 performs control such that the hub 70 coupled to the output shaft 30 in a state in which the input shaft 10 and the output shaft 30 are synchronized by the medium-torque transmission is meshed with the clutch plate 50.

For example, when factors, such as vehicle speed and wheel speed, reflecting the driving state of the vehicle are detected by sensors to be input to the controller 100, the controller 100 analyzes the input values to determine whether the high-torque transmission condition is satisfied, and as a result of the determination, the controller 100 performs, when determines that the high-torque transmission condition is satisfied, a differential limiting action by causing the second piston 80 to operate through the operation of the pressure driving source (pump) 90 such that the hub 70 is moved and thus the hub outer tooth 72 is mechanically spline-coupled to the plate outer tooth.

For reference, the controller 100 according to an embodiment of the present disclosure may be implemented through a non-volatile memory (not shown) configured to store data relating to an algorithm configured to control the operation of various elements of a vehicle or software instructions for reproducing the algorithm, and a processor (not shown) configured to perform the operations described below using data stored in the corresponding memory. In this case, the memory and the processor may be implemented as separate chips. Alternatively, the memory and processor may be implemented as a single chip integrated with each other. A processor may have one or more processors.

In view of the operation process of medium-torque transmission and high-torque transmission by the limited slip differential, as an example, when the differential limiting action to a medium-torque level is required by the limited slip differential in a state in which the differential limiting action is released as shown in FIG. 2, the first piston 60 is operated by hydraulic pressure to compress and engage the multi-plate clutch 40 as shown in FIG. 3.

Accordingly, the differential action is limited to a medium-torque level (ex: 2300 Nm) by the compression engaging force of the multi-plate clutch 40.

When the differential limiting action to a high-torque level is required in a state in which the differential action is limited to the medium-torque level as described above, as shown in FIG. 4, the second piston 80 is operated using hydraulic pressure to push the hub 70 toward the clutch plate 50, and accordingly, the hub outer tooth 72 is spline-coupled to the plate inner tooth 52.

That is, since the rotations of the input shaft 10 and the output shaft 30 are synchronized by the compression engaging force of the multi-plate clutch 40 before the hub outer tooth 72 is meshed with the plate inner tooth 52, the hub outer tooth 72 is naturally moved into the plate inner tooth 52 to be meshed therewith.

Therefore, the differential action is limited to a high-torque level (ex: 5000 Nm or more) by the mechanical coupling force between the hub 70 and the clutch plate 50.

Figure 5:
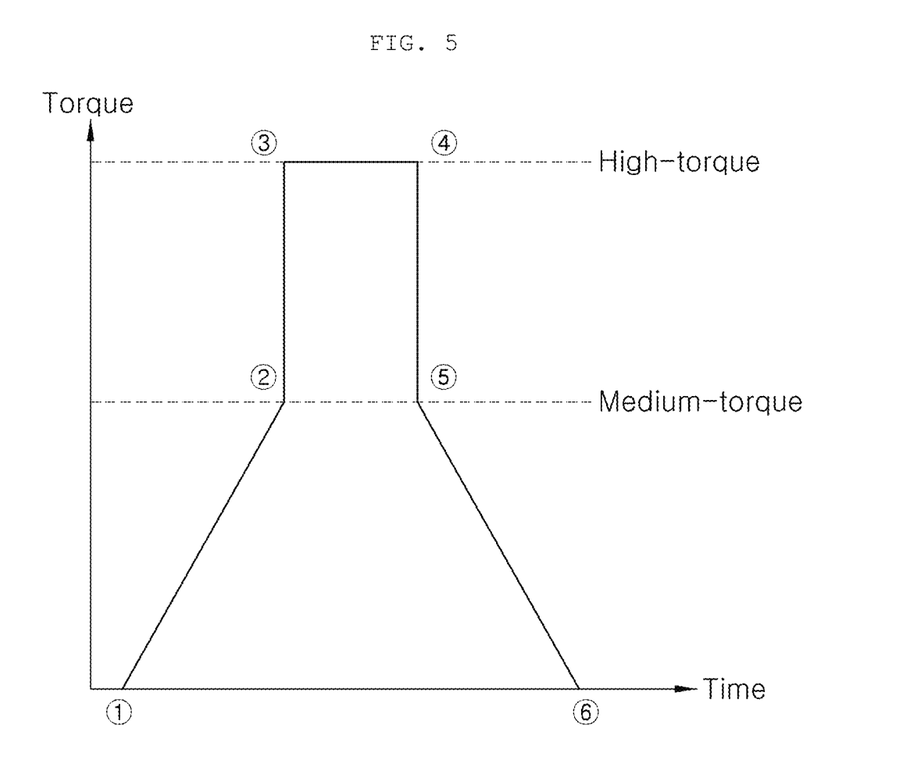
FIGS. 5 to 7 explain various transmission torque behaviors during a differential limiting action according to the present disclosure.

FIG. 5 shows a transmission torque behavior during a differential limiting action according to the present disclosure. Here, the multi-plate clutch 40 is engaged in a state in which the multi-plate clutch 40 is disengaged, and accordingly, the transmission torque gradually increases from point ① to point ②. At this time, point ② corresponding to a state in which the multi-plate clutch 40 is completely compressed and engaged is a point at which the differential limiting action is performed by a transmission torque at the medium-torque level.

Then, when the differential limit at a high-torque level is required, the hub 70 is pushed and the hub outer tooth 72 is meshed with the plate inner tooth 52, and accordingly, the transmission torque rises sharply from point ② to point ③. That is, at the time ③ corresponding to a state in which the hub 70 and the clutch plate 50 are mechanically engaged with each other is a point at which the differential limiting action is performed by a transmission torque at the high-torque level.

Thereafter, when the differential limit at the medium-torque level is required again while differential limit at the high-torque level is maintained until reaching point ④, the hub 70 is restored and moved such that the hub outer tooth 72 meshed with the plate inner tooth 52 is released therefrom, and accordingly, the transmission torque drops sharply from point ④ to point ⑤. However, point ⑤ corresponding to a state in which the multi-plate clutch 40 is compressed and engaged is a point at which the differential limiting action is still performed by the transmission torque at the medium-torque level.

When the differential limiting action is unnecessary, the multi-plate clutch 40 is disengaged, and accordingly, the transmission torque is gradually lowered from point ⑤ to point ⑥, and the differential limiting action is completely released at point ⑥.

Figure 6:
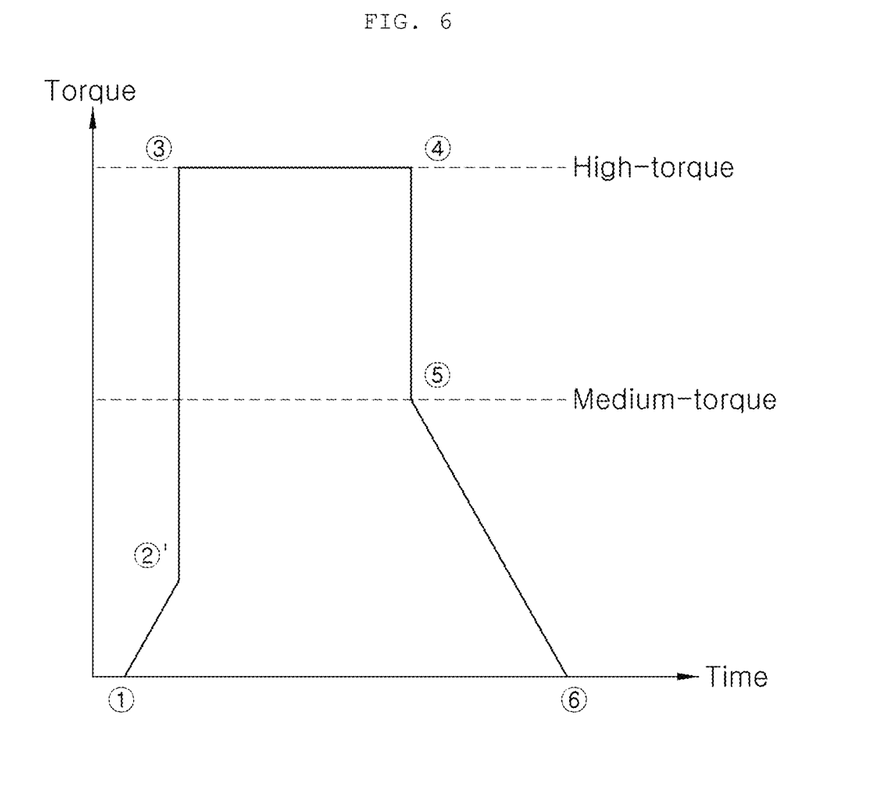

FIG. 6 shows another transmission torque behavior during a differential limiting action according to the present disclosure. Here, when a differential limiting action at the medium-torque level is required, the multi-plate clutch 40 is engaged, thereby gradually increasing the transmission torque from point ①.

However, when the differential limiting action at a high-torque level is required before the multi-plate clutch 40 is completely engaged, the hub 70 is moved during the process of the multi-plate clutch 40 being engaged such that the hub outer tooth 72 is meshed with the plate inner tooth 52, and accordingly, the transmission torque rises sharply from point ②' to point ③. Although the torque at point ②' is smaller than the torque in a state in which the multi-plate clutch 40 is completely engaged, the torque at point ②' is a level of torque that has no problem in realizing synchronization of the input shaft 10 and the output shaft 30.

That is, when the differential limiting action at the high-torque level is required during the process of the differential limiting action at the medium-torque level, the hub 70 is immediately operated such that the hub 70 is mechanically coupled to the clutch plate 50, thereby performing the differential limiting action at the high-torque level.

Figure 7:
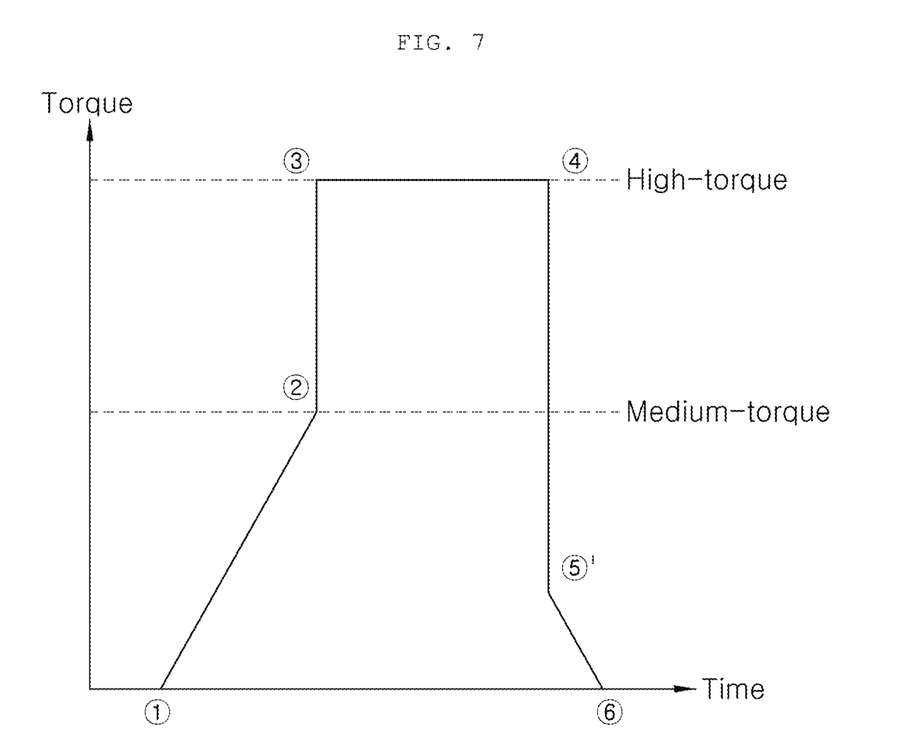

FIG. 7 shows another transmission torque behavior during a differential limiting action according to the present disclosure. Here, when the differential limiting action at the medium-torque level or less is required in the differential limiting action at the high-torque level, the hub 70 is restored and moved such that the hub outer tooth 72 meshed with the plate inner tooth 52 is released therefrom, and simultaneously, a part of the engaging force of the multi-plate clutch 40 is released, and accordingly the transmission torque drops sharply from point ④ to point ⑤'.

Then, the engaging force of the multi-plate clutch 40 is completely released, and accordingly, the transmission torque gradually descends from point ⑤' to point ⑥, and the differential limiting action is completely released at point ⑥.

That is, when the differential limiting action at a level slightly lower than the medium-torque level is required in a state in which the differential limiting action is performed at the high-torque level, only a part of the engaging force of the multi-plate clutch 40 is released right after the mechanical coupling between the hub 70 and the clutch plate 50 is released, and accordingly, the differential limiting action is performed at a level slightly lower than the medium-torque level.

Figure 8:
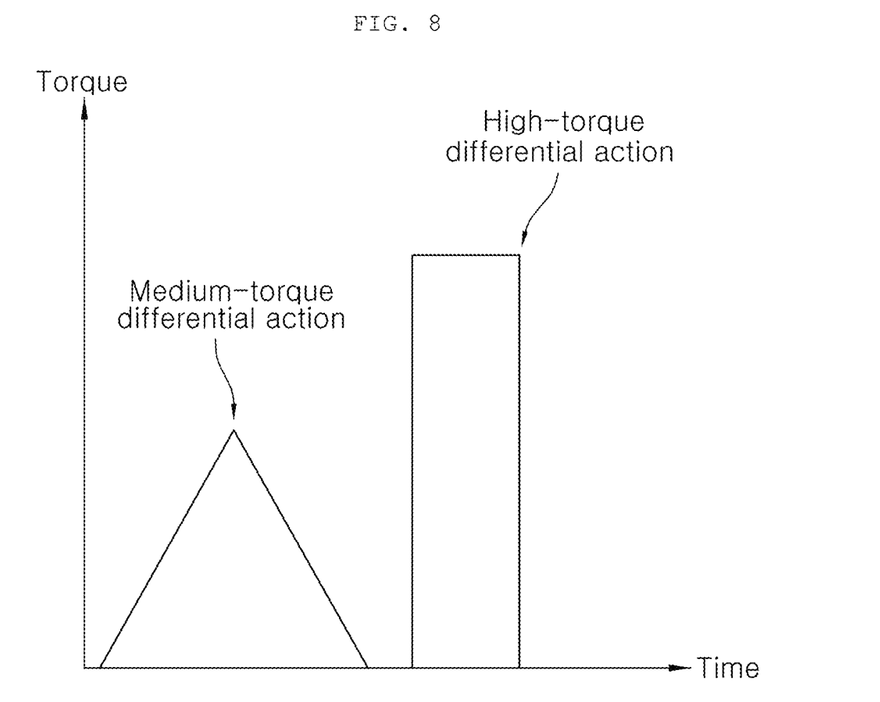
FIG. 8 explains a transmission torque behavior during a differential limiting action to which the present disclosure is not applied.

FIG. 8 shows a transmission torque behavior when the differential limiting action at the medium-torque level and the differential limiting action at the high-torque level are not continuously performed. Here, after the differential limiting action at the medium-torque level, the corresponding medium-torque differential limiting action is released. Then, after stopping the vehicle, the differential limiting action at the high-torque level is performed again.

That is, the differential limiting operation cannot be smoothly performed when the differential limiting operation at the medium-torque level and the differential limiting operation at the high-torque level are not continuously performed.

As described above, the present disclosure enables continuous switch between a differential limiting action at a medium-torque level and a differential limiting action at a high-torque level, so that the differential limiting transmission torque can be seamlessly connected to a target transmission torque.

Therefore, the present disclosure improves the escape performance of a vehicle in road conditions, such as rough roads and low friction roads, and enables a differential limiting action to be switched according to the increase or decrease of the transmission torque without separate manipulation by a driver, thereby enhancing the driving convenience of the driver.

Although the present disclosure has been described in detail only with respect to the above specific examples, it is apparent to those skilled in the art that various modifications and variations are possible within the scope of the technical spirit of the present disclosure, and such variations and modifications are within the scope of the appended claims.

DESCRIPTION OF REFERENCE NUMERALS

1: Differential case
10: Input shaft
12: Shaft portion
14: Input retainer
20: Inner shaft
30: Output shaft
32: Shaft portion
34: Output retainer
40: Clutch pack (multi-plate clutch)
42: Driving disk
44: Driven disk
50: Clutch plate
52: Plate inner tooth
60: First piston
70: Hub
72: Hub outer tooth
80: Second piston
90: Pressure driving source
100: Controller

What is claimed is:

1. A limited slip differential comprising:
an input shaft constantly connected to a differential case of a differential;
an output shaft selectively connected to the input shaft via a clutch pack and constantly connected to a wheel;
a medium-torque transmission means configured to press a clutch plate coupled to the input shaft such that the clutch pack is compressed and engaged; and
a high-torque transmission means by which a hub coupled to the output shaft is moved in a state in which the input shaft and the output shaft are synchronized according to the engagement of the clutch pack and thus is selectively meshed with the clutch plate,
wherein the high-torque transmission means comprises:
a plate inner tooth formed on the clutch plate,
the hub spline-coupled to an outer peripheral surface of the output shaft to be moved in an axial direction,
a hub outer tooth formed on the hub in a shape corresponding to the plate inner tooth so as to be meshed with the plate inner tooth, and
a second piston configured to press the hub such that the hub outer tooth is moved to a location at which the hub outer tooth is meshed with the plate inner tooth,
wherein an output retainer is integrally formed in a cylindrical shape extending in an outer radial direction from a shaft portion of the output shaft,
wherein one end of the hub is spline-coupled to the outer peripheral surface of an end portion of the output retainer, and
wherein the other end of the hub is inwardly bent to be pressed by the second piston.

2. The limited slip differential of claim 1, wherein the medium-torque transmission means comprises:
a first piston configured to press the clutch plate in a direction in which the clutch pack is engaged,
wherein the clutch plate is provided at an end portion of the clutch pack and spline-coupled to the inner peripheral surface of the input shaft to be moved in the axial direction.

3. The limited slip differential of claim 1, wherein the plate inner tooth is formed on the inner peripheral surface of the clutch plate; and
the hub outer tooth is formed on the outer peripheral surface of the hub to be spline-coupled to the plate inner tooth.

4. A method for controlling an operation of the limited slip differential of claim 1, the method comprising:
a medium-torque transmission step in which when a medium-torque transmission condition required by the limited slip differential according to a driving state of a vehicle is satisfied, a controller performs control such that the clutch plate is pressed to enable the clutch pack to be compressed and engaged; and
a high-torque transmission step in which when a high-torque transmission condition required by the limited slip differential according to a driving state of the vehicle is satisfied, the controller performs control such that the hub coupled to the output shaft in a state in which the input shaft and the output shaft are synchronized by the medium-torque transmission is meshed with the clutch plate.

* * * * *